United States Patent [19]

Gerber

[11] Patent Number: 4,653,392

[45] Date of Patent: Mar. 31, 1987

[54] MUFFIN BAKING PAN FOR PRODUCING MUFFIN WITH OPEN CAVITY

[76] Inventor: Bernard V. Gerber, 3707 Downey Dale Dr., Randallstown, Md. 21133

[21] Appl. No.: 798,905

[22] Filed: Nov. 18, 1985

[51] Int. Cl.⁴ ............................................. A47J 27/00
[52] U.S. Cl. ...................................... 99/439; 249/142
[58] Field of Search ............... 99/426, 428, 439, 382, 99/383; 249/142; 403/254, 255, 407.1

[56] References Cited

U.S. PATENT DOCUMENTS

| | | | |
|---|---|---|---|
| 169,264 | 10/1875 | High | 99/439 |
| 1,567,234 | 12/1925 | Brucker | 249/142 X |
| 1,627,421 | 5/1927 | Watkins | 99/439 |
| 1,979,429 | 11/1934 | Wilkes | 99/439 |
| 2,091,422 | 8/1937 | Steffan | 99/439 |
| 2,960,218 | 11/1960 | Cheeley | 249/142 X |
| 3,196,777 | 7/1965 | Luker | 99/439 |

Primary Examiner—Billy J. Wilhite
Attorney, Agent, or Firm—Walter G. Finch

[57] ABSTRACT

The invention concerns a baking pan assembly for forming a cavity in a muffin to which a filling may be subsequently added. The recessed cup portion of a baking pan is provided with a keyed-orifice. A conical or other symmetrical insert having a key mate with the orifice, such that the insert is centrally located in the recessed cup bottom. Alternately, single use conical or other symmetrical inserts may be placed in the recessed cup, made of paper, foil, heat resistant plastic, etc. A retaining plate may be positioned above the pan if desired to restrain the batter as it rises to form a flattened surface opposite the cavity for perfect stability once the muffin is inverted.

17 Claims, 10 Drawing Figures

MUFFIN BAKING PAN FOR PRODUCING MUFFIN WITH OPEN CAVITY

BACKGROUND OF THE INVENTION

The invention relates generally to a baking pan assembly having inserts for making muffins with a cavity in each muffin, into which cavity other foodstuffs, such as filling, can be inserted.

Muffins and cupcakes are common foodstuffs and sold in many stores, including various national food chains. Muffins are available in many recipes, varying from sweet to salty. The mix can contain various ingredients, such as various flours, bran, and other similar products. Such muffins often contain fruits, nuts, and other ingredients mixed into the batter. It is to be noted that such ingredients must retain an appropriate consistency after baking, which limits the possibly added ingredients to raisins, cranberries, blueberries, and similar fruits.

However, fresh fruits, such as strawberries, peaches and apples which may become mushy or soft are not commonly used in the mix. Thus, resort must usually be made to dried fruits as opposed to fresh fruits; eg, strawberries, etc. The present invention overcomes the necessity of using only dried fruits or those that retain their consistency.

With doughnuts, eclairs, and the like, fillings are injected in a more or less liquified state. The liquification required for injection limits the types of fillings which can be used. A true food paste, such as a thick fruit preserve is difficult to inject. Filling the open, baked-in cavity created by the present invention is a simplified matter.

With the present invention the cavities can be pre-filled and packaged for sale, or freshly filled in a restaurant for instance, to a customer's selection. As a matter of fact, customers can add their own filling, perhaps at home or a buffet type restaurant or with separately packaged fillings supplied with the muffin. Fillings can be sweet, savory, fruit preserve, pie filling, fruit paste, nut paste, cake icing, ice cream, or a cream and/or custard base dessert. In the case of savory fillings, seafood salads, chicken salad, tuna salad, cheese dips, may be included.

SUMMARY OF THE INVENTION

The invention concerns a baking pan assembly having inserts for making muffins with cavities into which fillings may be inserted. A baking pan is presented having a central means in the bottom of the cup recess for forming a cavity in a muffin as the muffin is baked. The bottom of the recessed cup includes a hole with a key-slot via which a cone-shaped cavity forming member is attached. The cone includes a key which is engaged by the key-hole such that the cone is centered in the pan's recessed cup. Alternately, formed inserts with annular bases of foil, greased paper or cardboard for instance, may be placed on the bottom of the recessed cup, the annular, base substantially covering the cup bottom. Also included is a rise-level retaining plate which may be attached to the top of the pan for forming the muffins with a perfectly flat side, if desired. Once baked, the muffins are turned upside down and the cavity filled as desired.

DETAILED DESCRIPTION OF THE INVENTION

Figure 1:
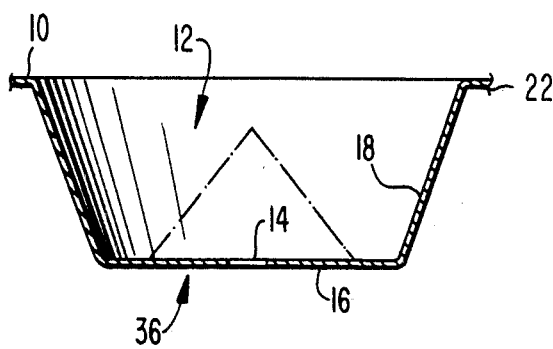
FIG. 1 having a centrally located orifice is a side view of a baking pan recessed cup.

FIG. 1 shows the body 10 of a muffin baking pan, having a recessed cup 12 into which batter is poured. The body 10 and recessed cup 12 are typical of common baking pans. In accordance with the present invention the recessed cup 12 is provided with an orifice 14, located centrally at the bottom 16 of the recessed cup 12. The function and shape of the orifice 14 are detailed with respect to FIG. 2. Adjacent to the bottom 16 is a wall 18, sloping upward to an edge 22. The phantom lines show the relationship of a conical insert (discussed below) relative to the recessed cup 12.

Figure 2:
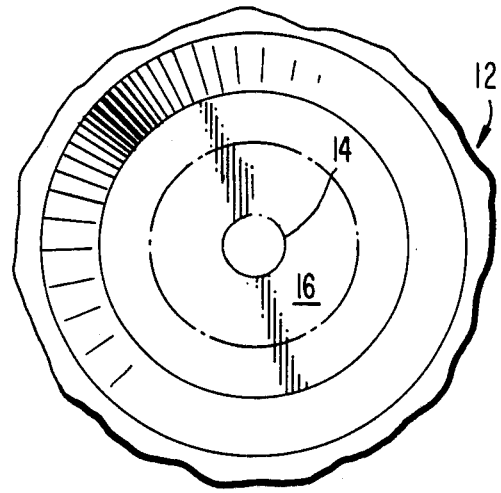
FIG. 2 is a top view of the recessed cup of FIG. 1.

FIG. 2 shows a top view of the recessed cup 12 of FIG. 1. It is evident from this view that the orifice 14 is substantially centrally located in the bottom 16 of the recessed cup 12. In the preferred embodiment of the invention as shown in FIG. 2A an orifice 14A comprises a larger portion 24 and a slotted portion 26, the two portions forming a key-hole.

Figure 3:
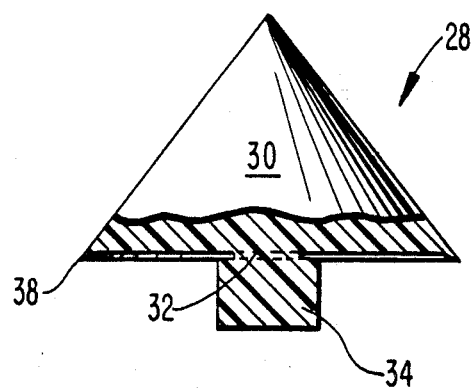
FIG. 3 is a conical insert for forming muffin cavities.

FIG. 3 shows an insert 28 which engages the recessed cup 12, and forms a cavity within a muffin as the muffin is baked in the pan. The insert 28 has a cone body from which a shaft 32 projects. The shaft 32 and the cone 30 are coaxially aligned. Integral with the shaft 32 is a keying means 34 which is passed through orifice 14A. The keying means 34 will only pass through the larger portion 24 of the orifice 14A of FIG. 2A the cone 30 being slid into place such that the keying means 34 engages the underside 36 (See FIG. 1) of the recessed cup 12, while the slotted portion 26 partially surrounds the shaft 32. The cone 30 includes a flexible edge 38 about its circumference. The circumventing flexible edge 38 extends below the cone 30 in the direction of the shaft 32, creating a biasing means. The extension of the edge below the cone 30 and its flexibility causes the cone to be biased out of the recessed cup 12.

Figure 2A:
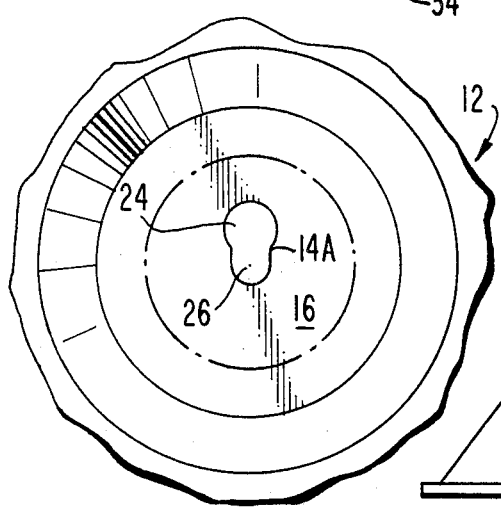
FIG. 2A is a top view of the recessed cup of FIG. 1 having an orifice of keyhole shape.
Figure 9:
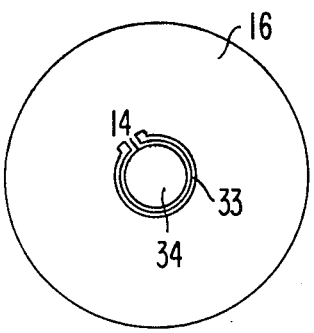
FIG. 9 is a partial bottom view of a recessed cup in a baking pan showing a retaining snap ring.

In an alternate attachment means orifice 14A of FIG. 2A is replaced by a central circular orifice 14 shown in FIGS. 2 and 9. The shaft 34 of insert 28, as shown in FIG. 3, is placed through this orifice 14 in the bottom 16 of the recessed cup 12. A flat U-shaped retaining snap ring 33 having an inner dimension equal to the diameter of shaft 32 and an outer dimension larger than key 34 is slipped into an annular slot formed between shaft 32 and key 34. The thickness of the flat retaining ring allows a snug fit in the slot. Insert 28 is thus retained within recessed cup 12.

Figure 4:
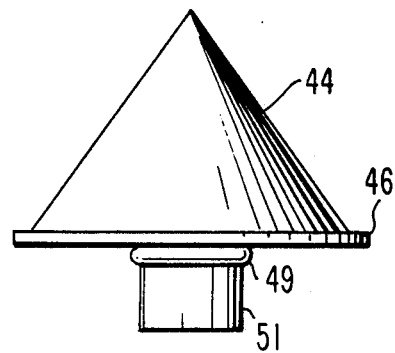
FIG. 4 shows a conical insert with an annular flange.

FIG. 4 portrays another embodiment of an insert for forming the cavity within a muffin bottom. Here, a solid, pointed conical insert 44 is provided with an annular flange 46 having a diameter substantially equal to the diameter of a recessed cup bottom. Accordingly, this insert may be placed in the recessed cup, without a means for engaging the cup bottom (such as the keying means discussed above), for one-time use in the manner of cup-cake baking papers. It is apparent, therefore, that the one-time insert may be constructed of coated cardboard, coated or greased paper or foil.

Figure 5:
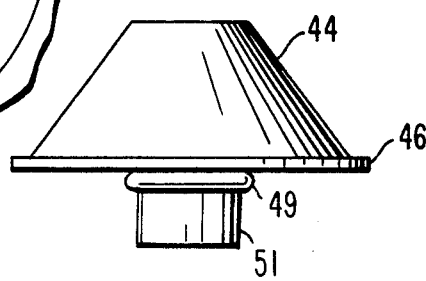
FIG. 5 reveals a truncated-cone insert with an annular flange.
Figure 6:
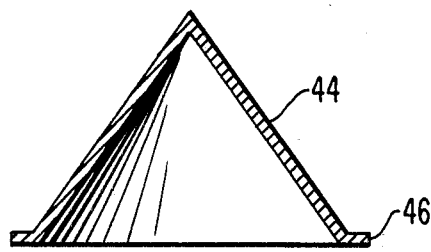
FIG. 6 portrays a hollow version of the FIG. 4 embodiment.
Figure 7:
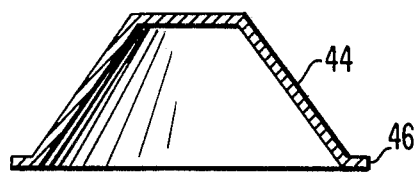
FIG. 7 displays a hollow version of the FIG. 5 embodiment.

FIG. 5 shows a solid insert 44 with an annular flange 46, which functions substantially as the FIG. 4 device. However, the solid insert is created in the form of a truncated-cone, for shaping a cavity of greater volume. FIGS. 6 and 7 reveal cross-sectional views of inserts which are hollow, and correspond to the FIGS. 4 and 5 inserts in terms of the cavity shapes formed therewith.

Figure 8:
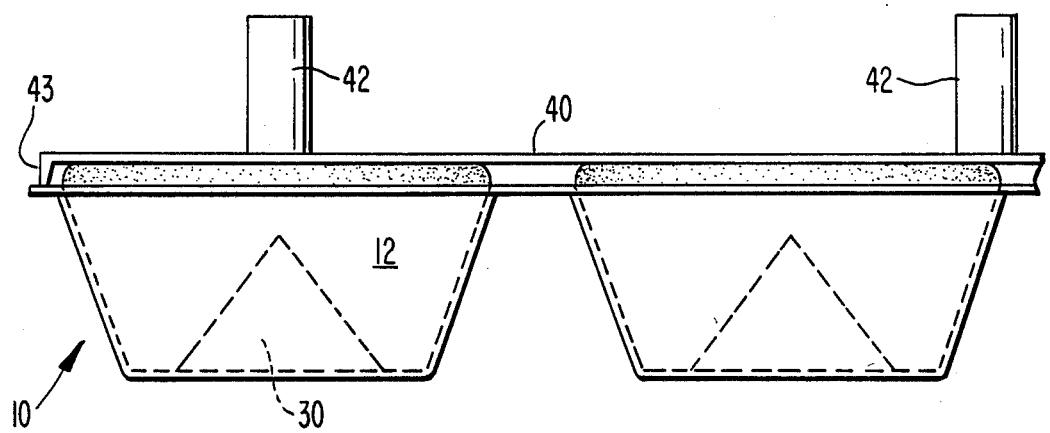
FIG. 8 shows a rise-level retaining plate to provide a muffin with a perfectly flat surface when inverted.

Once the muffin has been baked with a cavity, the muffin is inverted so that a filling may be readily added from above. If baked with a proper amount of batter, the muffin rests stably when inverted. However, the muffin can have a flattened side opposite the formed cavity, if desired. FIG. 8 shows such a means for providing a flat side to the muffin, opposite the cavity. The body 10 of a muffin pan is shown, with a cone 30 placed within the recessed cup 12. A retaining plate 40 is placed atop the body 10 which determines the rise level of the batter as the muffin bakes. The retaining plate 40 is spaced from the pan body 10 by means of support legs 43, allowing heat to reach the muffins for adequate baking. Upon baking, the batter will rise until meeting the retaining plate 40, and will then spread laterally. A smooth surface will result on the upper side (as viewed in FIG. 8) of the muffin. A weight 42 or heavy handle, or clip device may be used to maintain the retaining plate 40 in its position relevant to the body 10. Otherwise, the rising battery may lift the retaining plate resulting in muffins with curved or crooked tops.

It will be apparent to those skilled in the art that modifications of the present invention are possible, which do not depart from the spirit and scope of the present invention, being defined by the appended claims. For instance, the cavity forming means have any variety of shapes and materials and methods of attachment and may be created by using molds and dies to cast or otherwise form a pan with an integral cavity forming shape. Alternately, a cavity forming means may be created by joining multiple components in a stacked, chamfered relationship within the recessed cup.

What is claimed is:

1. A muffin baking pan for baking batter with a cavity, comprising, a body means;
   a recessed means having a bottom in said body means for receiving batter to be baked;
   a forming means having a generally symmetrical rotational structure of cone shape attached to said recessed means for forming a cavity in said batter while baking;
   an attachment means includes an orifice in said recessed means through which said forming means is attached to said recessed means, a shaft connected to said cone which pases through said orifice, said shaft being axially aligned with a longitudinal axis to said cone, a flexing means for biasing said cone out of said recessed means, said flexing means having a flexible edge circumventing said cone.

2. A muffin baking pan as recited in claim 1, and additionally a key means connected to said shaft for engaging an underside of said recessed means.

3. A muffin baking pan as recited in claim 2, said orifice being located in a bottom surface of said recessed means.

4. A muffin baking pan as recited in claim 3, said orifice being substantially centered in said bottom surface.

5. A muffin baking pan as recited in claim 4, said orifice having a larger portion and a slotted portion which partially surrounds said shaft.

6. A muffin baking pan as recited in claim 3, wherein said orifice is a circular hole exactly centered in said bottom surface.

7. A muffin baking pan as recited in claim 6, and additionally a retaining means positioned atop said body means for determining a rise-level of said batter while baking.

8. A muffin baking pan as recited in claim 7, wherein said retaining means is a flat U-shaped snap ring positioned under the bottom of said recessed means.

9. A muffin baking pan as recited in claim 8, said retaining means being positioned opposite the bottom of said recessed means.

10. A muffin baking pan as recited in claim 9, said recessed means having a wall and an upper edge, and additionally spacing means for spacing said retaining means from said upper edge.

11. A muffin baking pan as recited in claim 10, said spacing means comprising support legs attached to said retaining means.

12. A muffin baking pan as recited in claim 11, said retaining means comprising a plate.

13. A muffin baking pan as recited in claim 12, and additionally a maintaining means for maintaining said plate in position relative to said body means.

14. A muffin baking pan for baking batter with a cavity, comprising,
    a body means;
    a recessed means in the body means for receiving said batter;
    a forming means consisting of an insert of generally symmetrical form and being of a hollow truncated cone-shape with a point placed in said recessed means for forming a cavity in said batter while baking, said insert having an annular flange, with said recessed means having a bottom upon which said annular flange rests.

15. A muffin baking pan as recited in claim 14, said insert being of paper construction.

16. A muffin baking pan as recited in claim 14, said insert being of foil construction.

17. A muffin baking pan as recited in claim 14, said insert being of heat resistant plastic construction.

* * * * *